Patented Dec. 9, 1947

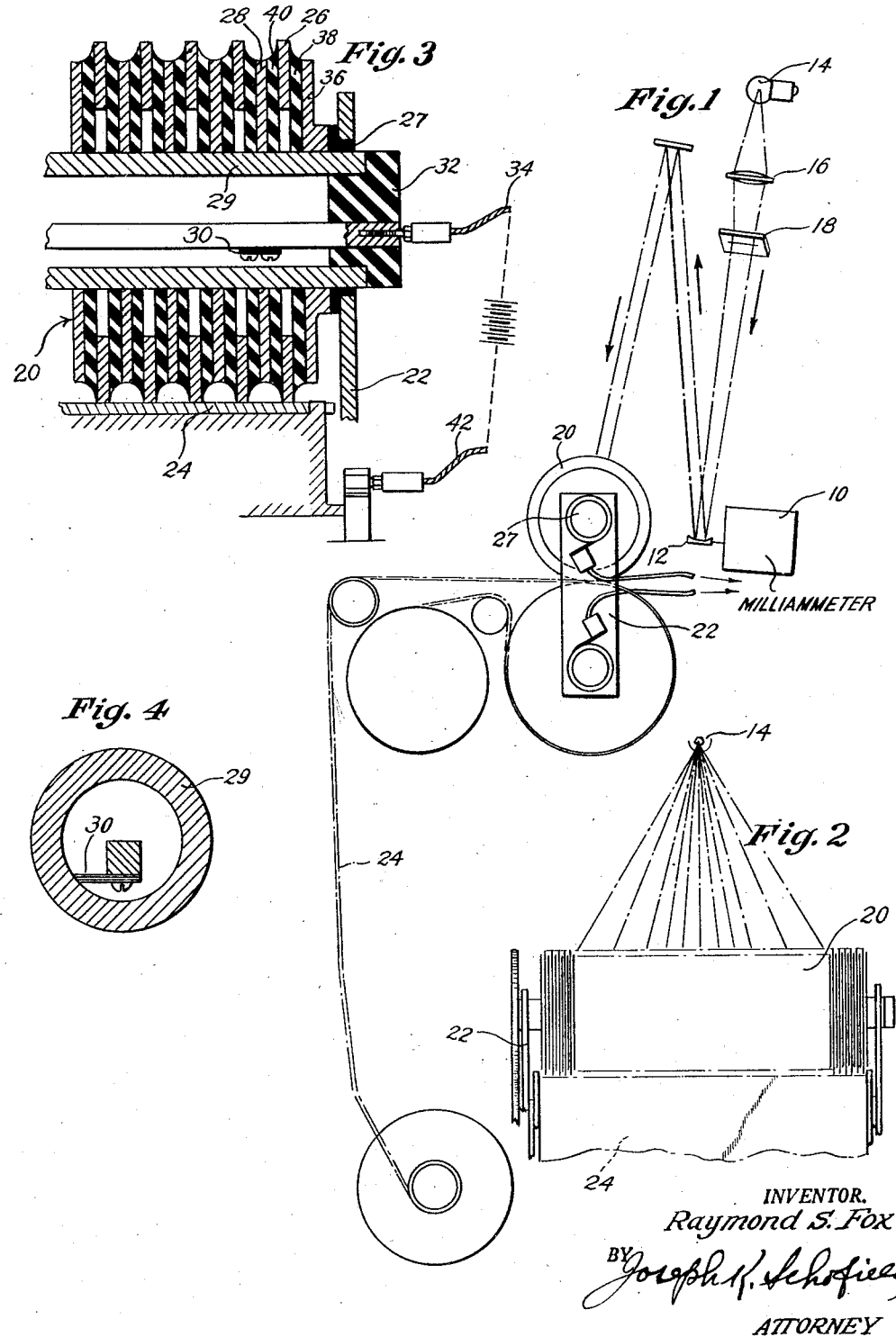

2,432,303

UNITED STATES PATENT OFFICE 2,432,303

CONTINUOUS ANGULARLY MOVABLE LIGHT BEAM RECORDER

Raymond S. Fox, West Hartford, Conn.

Application December 31, 1945, Serial No. 638,525

4 Claims. (Cl. 234—61)

This invention relates to recorders of the tilting mirror type.

More particularly the invention relates to a recording mechanism in which narrow, closely spaced areas of light sensitive material are effected by a pointed beam of light angularly movable and striking any one of the areas and closing an electric circuit to leave a mark or discolorization on a moving strip of specially treated record receiving paper corresponding in position to the particular area affected by the light beam.

An object of the present invention is to provide an improved and extremely sensitive recording device enabling the variable being measured to slightly tilt a mirror, a light beam deflected by this mirror impinging on any one of the series of narrow light sensitive areas to close an electric circuit and mark a strip of sensitized record receiving paper or other material in a position corresponding to the tilted position of the mirror.

Another object of the invention is to use the opening and closing of a circuit and thereby the passage of an electric circuit through a specially sensitized record receiving paper continuously advanced past the light sensitive mechanism to leave a mark or trace on the paper in alinement with the particular light sensitive area of the series of sensitized areas of the surface affected by the light beam.

With the above and other objects in view, the invention consists in the features of construction and operation set forth in the following specification and illustrated in the accompanying drawings.

In the accompanying drawings annexed hereto and forming a part of this specification, I have shown the invention embodied in a recording device for variations of an electrical characteristic acting upon an electrical indicating instrument but it will be understood that the invention can be otherwise embodied and that the drawing is not to be construed as defining or limiting the scope of the invention but is for illustration only, the claims appended to this specification being relied upon to define the invention.

In the drawings:

Figure 1 is a diagrammatic view in side elevation showing the cooperative relationship between the principal elements of the recording device.

Fig. 2 is a front elevation of the light sensitive element showing its relation to the beam of light used to render the recording device effective.

Fig. 3 is a detail view of a portion of the light sensitive element on an enlarged scale, and Fig. 4 is an end elevation showing some of the elements in Fig. 3.

In the above-mentioned drawings there has been shown but one embodiment of the invention which is now deemed preferable, but it is to be understood that changes and modications may be made within the scope of the appended claims without departing from the spirit of the invention.

Briefly, and in its preferred aspect, the invention may include the following principal parts: First, an electrical or other instrument having a movable indicator or pointer such as a milliammeter designed, when the characteristic being measured or recorded varies, to tilt a concave mirror so that a narrow beam of light from a fixed source may be directed upon different portions of a cylindrical member; second, alternate sections of electrically conductive and insulating means on said cylindrical member designed so that when a light beam impinges upon the surfaces of adjacent sections they will close an electric circuit; third, an electrically sensitized record receiving strip movable continuously but slowly past these members and in contact with the cylindrical member; and fourth, an electric circuit including those portions where the light beam has contacted the light sensitive areas of this cylindrical member and an electric current passed through the record receiving paper at that point.

Referring more in detail to the figures of the drawings, there is shown in Fig. 1 a diagram of the members forming the present recording device in which an electrical instrument 10 such as a milliammeter is used to indicate the variations of the element or condition being recorded. This variable may be a voltage, resistance, or indirectly any other variable, which is made to deflect the indicator of the instrument 10. Variation in position of the indicator tilts a concave mirror 12 attached thereto in accordance with variations of the condition being recorded.

A beam of light from a fixed source 14 such as a light bulb, through conventional focusing lens 16 and narrow slit 18, impinges upon the concave mirror 12 and the beam is then reflected to strike a narrow portion of an elongated cylindrical member 20. The extent of tilting of the concave mirror 12 for different variables within the range of the mechanism serves to traverse the beam of light from one end of the cylindrical member 26 to the other as indicated in Fig. 2.

Referring to Fig. 3, it will be seen that the cylindrical member 20 is rotatably mounted within a suitable frame 22, a portion only of which is shown, and rests upon the strip of record receiving paper 24 presently to be more fully described. The member 20 comprises a plurality of closely adjacent spaced metal rings 26 and 28 electrically insulated one from the other and each having contact at one point only with the record receiving strip. Any preferred means may be employed for rotating this disc, that shown comprising the standard advancing means for the continuously moving recording strip 24, the weight of the light sensitive cylindrical member 20 resting upon the upper surface of the record receiving strip 24 being sufficient to cause rotation of this member with the advancing movement of the record receiving strip which, as shown, is wrapped about a supporting member which may be slowly but positively rotated.

As these advancing means for the record receiving strip 24 form no part of the present invention and may be of any conventional type, it is not thought that any description thereof will be required. The record receiving strip 24 adapted particularly for use in this recorder is that known as "Teledeltos" paper and is sensitized in such a manner that wherever an electric current passes through the strip a mark is left upon its sensitized surface.

Referring specifically to the construction of the rotating cylindrical member, it will be seen that it is supported between suitable bearings 27 within the recorder frame 22 and comprises a central metal tube 29. Through the center of this tube extends a contact member 30 suitably insulated therefrom and from the frame 22, preferably by an insulating plug 32 at either end. This contact member 30 is supplied with a lead 34 enabling voltage to be applied to this lead from any suitable source of electricity. On the outside of the cylindrical member 20 adjacent a suitable flange 36 is a disc of insulating material 38 and then one of the rings 26 concentric with the tube 29 but spaced therefrom so that it is completely insulated therefrom. Adjacent this ring 26 is another ring member 28, the inner periphery of which is in metal to metal contact with the tube 29 and suitably spaced by a disc 40 of insulating material from the first ring 26. The entire cylindrical member 20 comprises alternate rings 26 and 28 of these different types. Alternate rings contact the tube 29 but are insulated from the interposed rings which are spaced a substantial radial distance from the tube.

The outer surfaces of the insulating material areas 38 and 40 disposed between adjacent rings 26 and 28 are sensitized with selenium, or some other light sensitive material, so that when light rays from the beam of light deflected by mirror 12 strikes any portion of this surface an electric circuit will be completed from the lead 34 to the contact member 30, the tubular member 29, one of the rings 28, the sensitized paper 24, and the rotating and supporting member and advancing means for the record receiving strip to a corresponding lead 42. The leads 34 and 42 are connected to any suitable source of electricity. As the beam of light directed against this member 20 is extremely narrow and impinges upon only one of the surfaces 38 or 40 on either side of one of the rings 28 contacting the tube 29, only one of these rings will be enabled to pass current through the sensitized record receiving strip 24 in any position of the mirror 12 and its light beam. It will be this portion only of the record receiving strip 24 that will be marked by passage of the current as indicated in Fig. 2.

As the position of the mirror 12 tilted by the variable indicator of instrument 10 is oscillated by variations of the variable being measured, the beam of light will strike different areas of the sensitized surfaces 38 and 40 between the discs 26 and 28 from one end of cylindrical member 20 to the other. With a continuous slow movement of the record receiving strip 24 a series of marks from side to side of the strip will be plotted corresponding to the shifting of the beam of light by tilting the mirror actuated by the electrical indicating instrument.

I claim:

1. A recording device comprising in combination, a supporting member over which passes an electrically sensitized record receiving strip, advancing means for said strip, a freely rotating member contacting a surface of said strip, said rotating member having spaced narrow annular portions rendered conductive when illuminated, means to illuminate narrow sections along the length of said rotating member, a source of electric current, and a circuit including said source, the illuminated portion of said rotating member and the contacting portion of said strip, whereby a record is made of the succesively illuminated portions of said rotating member.

2. A recording device comprising in combination, a supporting member over which passes an electrically sensitized record receiving strip, advancing means for said strip, a freely rotating member having a plurality of closely adjacent disks contacting a surface of said strip, spacing means for said disks rendered conductive when illuminated, means to illuminate individual spacing means for said disks along the length of said rotating member, a source of electric current, and a circuit including said source, the illuminated spacing means on said rotating member and the contacting portion of said strip, whereby a record is made of the successively illuminated portions of said rotating member.

3. A recording device comprising in combination, a supporting member over which passes an electrically sensitized record receiving strip, advancing means for said strip, a freely rotating member contacting a surface of said strip at closely adjacent points, said rotating member having spaced narrow annular portions between said strip contacting points rendered conductive when illuminated, means to illuminate individual narrow sections along the length of said rotating member, a source of electric current, and a circuit including said source, the illuminated portion of said rotating member and the contacting portion of said strip, whereby a record is made of the successively illuminated portions of said rotating member.

4. A recording device comprising in combination, a supporting member over which passes an electrically sensitized record receiving strip, advancing means for said strip, a freely rotating member comprising closely adjacent metal disks contacting a surface of said strip, said rotating member having spaced narrow annular portions between said metal disks rendered conductive when illuminated, means to illuminate individual narrow sections along the length of said rotating member, a source of electric current, and a circuit including said source, the illuminated portion of said rotating member, a metal disk and the contacting portion of said strip, whereby a record is made of the successively illuminated portions of said rotating member.

RAYMOND S. FOX.

REFERENCES CITED

The following references are of record in the file of this patent:

UNITED STATES PATENTS

| Number | Name | Date |
|---|---|---|
| 894,886 | Herrick | Aug. 4, 1908 |
| 1,156,524 | Cox | Oct. 12, 1915 |